United States Patent [19]

Hosoda et al.

[11] 4,246,622
[45] Jan. 20, 1981

[54] OVERLOAD PROTECTIVE DEVICE OF ELECTRIC MOTORS

[75] Inventors: Kazumi Hosoda, Tachikawa; Masaharu Noguchi, Tokyo, both of Japan

[73] Assignee: Tokyo Shibaura Denki Kabushiki Kaisha, Japan

[21] Appl. No.: 956,726

[22] Filed: Nov. 1, 1978

[30] Foreign Application Priority Data

Nov. 8, 1977 [JP] Japan ............................ 52-149708[U]

[51] Int. Cl.³ .............................................. H02H 3/08
[52] U.S. Cl. ......................................... 361/95; 361/31
[58] Field of Search ....................... 361/31, 95, 96, 97

[56] References Cited

U.S. PATENT DOCUMENTS

| 3,558,978 | 1/1971 | Nye, Jr. et al. | 361/31 X |
| 3,786,311 | 1/1974 | Hobson, Jr. et al. | 361/95 X |

Primary Examiner—Harry E. Moose, Jr.
Attorney, Agent, or Firm—Stevens, Davis, Miller & Mosher

[57] ABSTRACT

A static type overload relay is used to protect a motor against overload. The overload relay comprises an integrator for integrating the difference between the motor current and a continuous current carrying capacity of the motor. When the output of the integrator exceeds a predetermined value, a circuit breaker connected in series with the motor is tripped.

3 Claims, 6 Drawing Figures

OVERLOAD PROTECTIVE DEVICE OF ELECTRIC MOTORS

BACKGROUND OF THE INVENTION

This invention relates to an overload protective device of an electric motor.

Heretofore, a heat responsive type overload relay has generally been used as the overload relay of an electric motor. Before explaining such overload relay a control circuit for driving a motor will first be described with reference to FIG. 1

In the control circuit shown in FIG. 1 the power of a source of alternating current 10 is rectified by a controlled rectifier 12 through a circuit breaker 11 and the rectified direct current is supplied to a direct current motor 13.

To protect the motor 13 against overload, according to a prior art system, the overcurrent condition is detected on the AC side by a current detector 14 such as a current transformer and the secondary current thereof is passed through a heat responsive type overload relay 15 for protecting the motor against a non-repeating overload. The term "non-repeating overload" is used to mean a permissible overload under a condition in which the load increases only once above a continuous rated load and then the load is reduced to zero as shown in FIG. 2. With this system, the motor can restart when its thermal characteristic returns to the original state.

Generally, however, in the actual running pattern, the motor runs under a load, although not always constant, after the occurrence of the overload so that in order to protect the motor operating under such load characteristic with the prior art system it is necessary to lower the setting of the relay 15 below the non-repeating overload of the motor shown by a solid line 1 in FIG. 3. However, as has been pointed out, since the actual load pattern is not always constant the selection of the setting of the relay is not simple but accompanied by the following problems. 1. When the setting is too high, the protection would become imperfect thus leading to burn out of the motor. 2. On the other hand, if the setting is too low the capacity of the motor would not be used completely.

A recent trend is to design the motor economically so that the latitude of the overload capacity becomes smaller. Hence more effective protective device has been desired.

SUMMARY OF THE INVENTION

Accordingly, it is an object of this invention to provide an efficient overload protective device for an electric motor for providing an optimum protection thereof without the difficulties described above.

Another object of this invention is to provide a static overload protective relay whose characteristics are not influenced by the operating condition of the motor.

Yet another object of this invention is to provide a static type overload protective relay which can be fabricated with an integrated circuit so that it is small, light weight and easy to handle.

According to this invention, there is provided a current detector for detecting current flowing through the motor; a static overload relay including integrating means for integrating the difference between the value of the current detected by the current detector and a predetermined value representing the continuous current carrying capacity of the motor, and means for producing an output when the output of the integrating means exceeds a predetermined value; and a circuit breaker connected in series with the motor and tripped by the output.

DESCRIPTION OF THE PREFERRED EMBODIMENT

Figure 3:
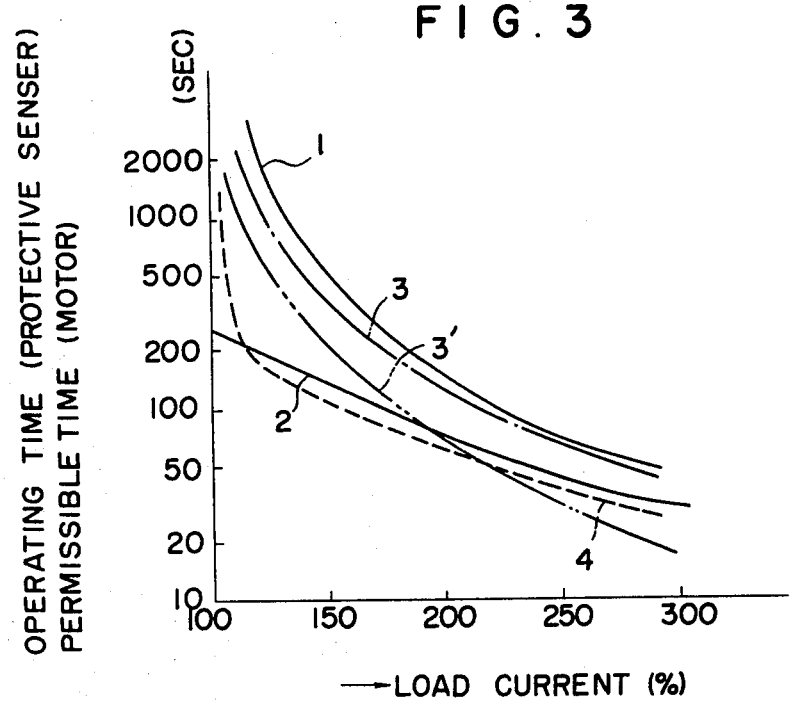
FIG. 3 is a graph showing the overload characteristics of the motor and the overload protective relay.
Figure 4:
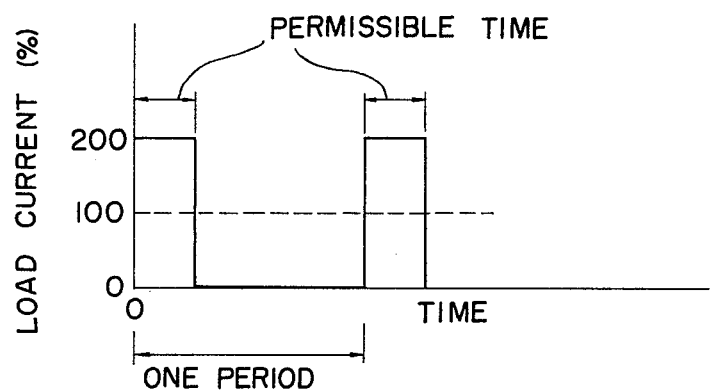
FIG. 4 is a graph showing one example of a repeating permissible overload pattern over a definite period.

Briefly stated, in accordance with this invention, a repeating overload over a definite period of a motor shown by a solid line 2 shown in FIG. 3 is protected by a static type overload relay having a protective characteristic shown by dotted lines 4, FIG. 3. The term "repeating overload" is used herein to mean a permissible overload whose effective value for a definite period, for example five minutes, is equal to the rated effective value as shown in FIG. 4.

Figure 1:
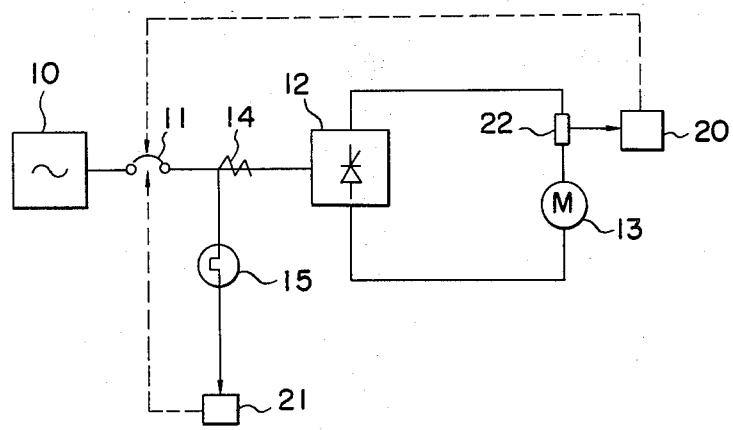
FIG. 1 is a basic connection diagram showing one embodiment of the overload protective device of an electric motor embodying the invention.

A preferred embodiment of this invention will now be described with reference to the accompanying drawing. Thus, according to this invention, the prior art heat responsive type overload relay 15 shown in FIG. 1 is substituted by a static overload relay having a dotted line characteristic 4 (FIG. 3) and connected on the DC side as a relay 20 or on the AC side as a relay 21, and the output of the relay 20 or 21 is used to trip the circuit breaker 11 as diagrammatically shown by dotted lines thereby protecting the motor 13 against repeating overload and burn out. The relay 20 operates in response to a load current signal detected by a current detector 22 in the form of a shunt or the like connected in series with the DC motor 13 whereas the relay 21 operates in response to a load current signal derived out from the secondary side of the current transformer 14 or the like connected on the AC side. In this case, the relay 15 is removed or the relay 20 or 21 is made to have a priority.

Figure 5:
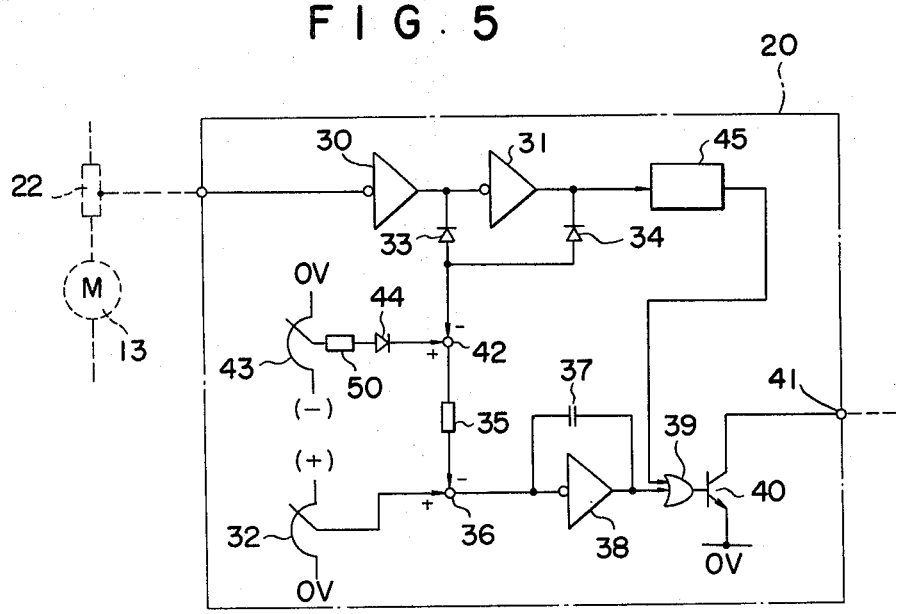
FIG 5 is a connection diagram showing one example of a static type overload relay utilized in the embodiment shown in FIG. 1
Figure 2:
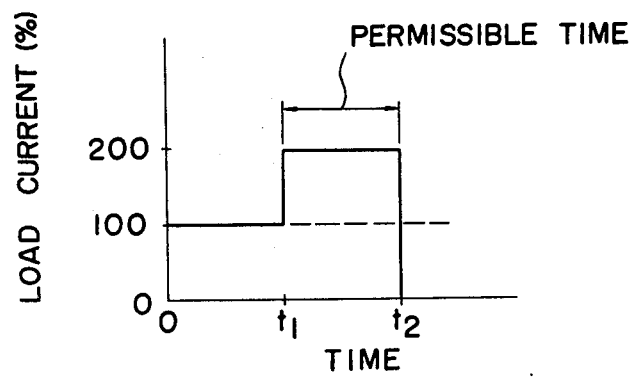
FIG. 2 is a graph showing one example of a non-repeating permissible overload pattern.

FIG. 5 is a connection diagram showing one example of the static overload relay 20. As shown, a motor current signal detected by inventing a shunt 22 is amplified by amplifiers 30 and 31, the outputs of which are respectively connected to diodes 33 and 34. Amplifiers 30 and 31 are cascaded so that a current detection signal of a constant polarity can be derived regardless of the polarity of the detected motor current. When the detected current is of one polarity one of diodes 33 and 34 is blocked, while when the detected current is of the opposite polarity, the other diode is blocked. A setter 32 for setting a value representing continuous current capacity of the motor 13 is used and the output of the setter 32 is compared by a comparator 36 with the outputs of amplifiers 30 and 31 which are supplied to the comparator 36 via diodes 33 and 34 and a common resistor 35. The difference or the output of the comparator 36 is applied to an integrating amplifier 38 including an integrating capacitor 37. When the integrated value reaches a predetermined value, a transistor 40 is turned ON via an OR gate circuit 39 to produce an abnormal condition detection signal on an output terminal 41. A comparator 42 is connected between the junction of the diodes 33 and 34 and resistor 35. The magnitude of a negative potential supplied by the amplifier 30 and through the diode 33 or by the amplifier 31 and through the diode 34 increases as the detected load current of the motor increases. A potentiometer 43, a resistor 50 and a diode 44 form a knee point setter which produces, when the magnitude of the potential from the diode 33 or 34 is in excess of the potential of a signal determined by the potentiometer 43, a signal having a positive polarity and having a magnitude which increases with the magnitude of the potential from the diode 33 or 34. Accordingly, the rate of increase of the magnitude of the output of the comparator 42, which produces the difference in magnitude between the output of the knee point setter and the output from the diode 33 or 34, is lowered in the range in which the output from the diode 33 or 34 exceeds the potential determined by the potentiometer 43. As a result the overload protective characteristic of the relay 20 would be as shown by the dotted line curve 4 (FIG. 3) having a knee point. Furthermore, an instantaneous overcurrent detector 45 is connected on the output side of amplifier 31 to turn ON transistor 40 via the OR gate circuit 39 so as to produce an abnormal condition detection signal.

Figure 6:
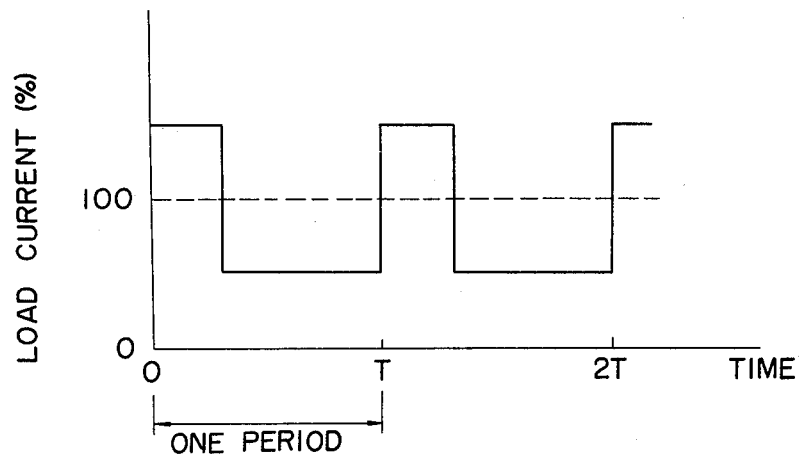
FIG. 6 is a graph showing a typical example of a load pattern.

In the foregoing description it was assumed that the repeating overload of the motor 13 is shown by the characteristic curve 2 shown in FIG. 3. The overload pattern under these condition is shown by FIG. 4. Generally, however, in an actual motor control, the motor is continuously operated under a certain load after the overload. Especially, when a load pattern of the same type repeats cyclically as shown in FIG. 6 it is possible to protect the motor against the repeating overload by setting the operating point of the relay 20 under such load pattern with the rated current setter 32 shown in FIG. 5. Since the protection of the motor against the repeating overload depends upon the load pattern, various types of protective characteristics are required. However, according to the overload protective device of this invention since it is easy to adjust or vary the protective characteristic it is possible to meet various requirements over a considerably wide range.

As above described, the overload protective device of this invention can protect a motor against repeating overload that has been impossible with the prior art protective device utilizing a heat responsive type overload relay. In addition, the invention has the following advantages.

1. As shown by the characteristic curve 3 or 3', as the characteristic of the heat responsive overload relay of the prior art system varies depending upon the condition of operation of the motor (that is hot start or cold start), with the characteristic curve 3' the protection becomes excessive, thus failing to effectively use the motor capacity. On the other hand, according to this invention since a static type overload relay is used the characteristic is not influenced by the operating condition thus preventing excessive protection.

2. Since the static type overload relay has a faster response than the heat response type overload relay, the protective device of this invention can provide better protection.

3. Since it is easy to add the performance of an overcurrent relay to the static type overload relay the protective device of this invention can protect both overload and overcurrent.

4. The static type overload protective device of this invention can be fabricated with such static electronic circuit as an integrated circuit, it is small, light and easy to handle.

Although in the foregoing embodiment the protective device of this invention was applied to the protection of a direct current motor, it will be clearly understood that the invention is equally applicable to any tupe of alternating current motor.

We claim:

1. An overload protective device for an electric motor, comprising:
   a current detector for detecting current flowing through said motor and producing a detection signal proportional in magnitude to the detected current;
   a static overload relay including;
      a knee point setter for producing, when said detection signal is in excess of a predetermined level, a signal having a polarity reverse to the polarity of said detection signal and having a magnitude which increases with the magnitude of said detection signal, thereby setting a knee point at a predetermined point along an overload protective characteristic of said static overload relay,
      a first comparator for producing a difference in magnitude between the output of said knee point setter and said detection signal,
      a rated current setter for setting a value representing a predetermined continuous current carrying capacity of said motor,
      a second comparator for producing a difference in magnitude between the output of said rated current setter and the output of said first comparator,
      an integrating means for integrating an output of said second comparator, and
      means for producing a tripping signal when an output of said integrating means exceeds a predetermined value, and
   a circuit breaker connected in series with said motor for interrupting the supply of current to said motor when tripped by said tripping signal.

2. The overload protective device as defined in claim 1 which further comprises an instantaneous overcurrent detector connected to the output of said current detector and an OR gate circuit having inputs connected to receive the output of said instantaneous overcurrent detector and the output of said integrating means and an tripping signal connected to said output producing means.

3. An overload protective device of an electric motor, comprising:
   a current detector for detecting current flowing through said motor and producing a detection signal proportional in magnitude to the detected current;
   a static overload relay including:
      a knee point setter for producing, when said detection signal is in excess of a predetermined level, a signal having a polarity reverse to the polarity of said detection signal and having a magnitude which increases with the magnitude of said detection signal, thereby setting a knee point at a predetermined point along an overload protective characteristic of said static overload relay, a first comparator for producing a difference in magnitude between the output of said knee point setter and said detection signal, a rated current setter for setting a value representing a predetermined continuous current carrying capacity of said motor, a second comparator for producing a difference in magnitude between the output of said rated current setter and an output of said first comparator, an integrator for integrating an output of said second comparator, an instantaneous overcurrent detector connected to an output of said current detector, an OR gate circuit having inputs connected to receive an output of said integrator and an output of said instantaneous overcurrent detector, a transistor responsive to an output of said OR gate circuit, and a circuit breaker connected in series with said motor for interrupting the supply of current to said motor when tripped by an output of said transistor.

* * * * *